(12) United States Patent
Bian et al.

(10) Patent No.: US 6,846,543 B2
(45) Date of Patent: Jan. 25, 2005

(54) THIN FILM MAGNETIC RECORDING DISK WITH RUTHENIUM-ALUMINUM LAYER

(75) Inventors: Xiaoping Bian, San Jose, CA (US); Mary Frances Doerner, Santa Cruz, CA (US); Jinshan Li, San Jose, CA (US); Mohammad Taghi Mirzamaani, San Jose, CA (US); Kai Tang, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 10/850,735

(22) Filed: May 21, 2004

(65) Prior Publication Data

US 2004/0213950 A1 Oct. 28, 2004

Related U.S. Application Data

(63) Continuation of application No. 09/547,439, filed on Apr. 12, 2000, now abandoned, which is a continuation-in-part of application No. 09/295,267, filed on Apr. 20, 1999, now abandoned.

(51) Int. Cl.[7] .............................. G11B 5/66; G11B 5/70; B32B 15/00; B32B 3/02; B05D 5/12
(52) U.S. Cl. ................................ 428/65.6; 428/694 TS; 428/611; 428/668; 428/900; 428/336; 427/128; 427/131
(58) Field of Search .......................... 428/65.6, 694 TS, 428/611, 668, 900, 336; 427/128, 131

(56) References Cited

U.S. PATENT DOCUMENTS 5,693,426 A   12/1997   Lee et al. .................... 428/611
6,110,582 A   8/2000    Wu et al. .................... 428/332
6,143,388 A   11/2000   Bian et al. .................. 428/65.3
6,159,625 A   12/2000   Ueno ...................... 428/694 T
6,383,404 B1 * 5/2002   Sakai et al. .................... 216/97

FOREIGN PATENT DOCUMENTS

JP      11126322 A1   5/1999

OTHER PUBLICATIONS

D.E.Laughlin, et al., "The Control and Characterization of the Crystallographic Texture of Longitudinal Thin Film Recording Media", IEEE Transactions on Magnetics, vol. 32, No. 5, 9/96, pp. 3632–3637.

L.L.Lee, et al., "Seed Layer Induced (002) Crystallographic Texture in Nial Underlayers", J. Appl. Phys., 79(8), Apr. 15, 1996, pp. 4902–4904.

* cited by examiner

Primary Examiner—Holly Rickman
(74) Attorney, Agent, or Firm—G. Marlin Knight

(57) ABSTRACT

A magnetic thin film disk for use in a disk drive with a ruthenium-aluminum (RuAl) seed layer with B2 structure followed by a NiAl layer is described. The disk has reduced noise and increased squareness which results in improved recording performance in a disk drive utilizing the disk. The improved disk is formed by first depositing the RuAl seed layer on the substrate then the NiAl layer is deposited onto the NiAl, followed by the other layers required for a magnetic disk such as an underlayer material with a lattice parameter compatible with RuAl such as Cr-alloy, followed by a standard hcp magnetic material. The RuAl seed layer promotes a [100] preferred orientation in the underlayer which in turn promotes a [11$\bar{2}$0] preferred orientation in the magnetic layer.

20 Claims, 2 Drawing Sheets

THIN FILM MAGNETIC RECORDING DISK WITH RUTHENIUM-ALUMINUM LAYER

RELATED APPLICATION

This application is a continuation of application Ser. No. 09/547,439 Apr. 12, 2000, now abandoned which is a continuation-in-part of application Ser. No. 09/295,267 filed on Apr. 20, 1999, now abandoned.

FIELD OF THE INVENTION

This invention relates to the field of thin film materials used in magnetic disks for data storage devices such as disk drives. More particularly the invention relates to thin film seed layers used to influence the crystal structures on the magnetic disks.

BACKGROUND OF THE INVENTION

The magnetic recording disk in a conventional drive assembly typically consists of a substrate, an underlayer consisting of a thin film of chromium (Cr) or a Cr alloy, a cobalt-based magnetic alloy deposited on the underlayer, and a protective overcoat over the magnetic layer. A variety of disk substrates such as NiP-coated AlMg, glass, glass ceramic, glassy carbon, etc., have been used. The microstructural parameters of the magnetic layer, i.e., crystallographic preferred orientation (PO), grain size and magnetic exchange decoupling between the grains, play key roles in controlling the recording characteristics of the disk. The Cr underlayer is mainly used to control such microstructural parameters as the PO and grain size of the cobalt-based magnetic alloy. The PO of the various materials forming the layers on the disk is not necessarily an exclusive orientation which may found in the material, but is merely the dominant orientation. When the Cr underlayer is deposited at elevated temperature on a NiP-coated AlMg substrate a [100] preferred orientation (PO) is usually formed. This PO promotes the epitaxial growth of [11$\bar{2}$0] PO of the hcp cobalt (Co) alloy, thereby, improving the in-plane magnetic performance of the disk for longitudinal recording. The [11$\bar{2}$0] PO refers to a film of hexagonal structure whose (11$\bar{2}$0) planes are predominantly parallel to the surface of the film. Likewise the [10$\bar{1}$0] PO refers to a film of hexagonal structure whose (10$\bar{1}$0) planes are predominantly parallel to the surface of the film. Since nucleation and growth of Cr or Cr alloy underlayers on glass and most non-metallic substrates differ significantly from those on NiP-coated AlMg substrates, media fabricated on glass substrates often have larger noise compared with those made on NiP-coated AlMg substrates under identical deposition conditions. The trend toward higher rotation speeds and tighter mechanical tolerances is making NiP/AlMg substrates less desirable. The use of a judiciously chosen initial layer on the substrate (called the seed layer) allows the performance of alternative substrates to equal or exceed NiP/AlMg disks. The seed layer is formed between the alternative substrate and the underlayer in order to control nucleation and growth of the underlayer which in turn affects the magnetic layer. Several materials have been proposed for seed layers such as: Al, Cr, CrNi, Ti, Ni$_3$P, MgO, Ta, C, W, Zr, AlN and NiAl on glass and non-metallic substrates. (See for example, "Seed Layer induced (002) crystallographic texture in NiAl underlayers," Lee, et al., J. Appl. Phys. 79(8), 15 Apr. 1996, p. 4902ff). In a single magnetic layer disk, Laughlin, et al., have described use of an NiAl seed layer followed by a 2.5 nm thick Cr underlayer and a CoCrPt magnetic layer. The NiAl seed layer with the Cr underlayer was said to induce the [10$\bar{1}$0] texture in the magnetic layer. ("The Control and Characterization of the Crystallographic Texture of Longitudinal Thin Film Recording Media," IEEE Trans. Magnetic. 32(5) September 1996, 3632).

The design of magnetic disks has progressed rapidly in recent years making improvements ever more difficult. In some metrics, e.g. signal-to-noise ratio (SNR), even 1 dB improvement is now quite significant. The further improvement in SNR remains as one of the major challenges in high density recording technology.

SUMMARY OF INVENTION

The design of a thin film disk, for use in a disk drive, with a ruthenium-aluminum (RuAl) seed layer with B2 structure followed by a NiAl layer is described. The disk has reduced noise and increased squareness which results in improved recording performance in a disk drive utilizing the disk. The improved disk is formed by depositing the RuAl seed layer on the substrate, followed by an underlayer material with a compatible lattice parameter such as Cr-alloy, preferably followed by an onset layer and a standard hcp magnetic material. A protective overcoat will also typically be applied. The RuAl seed layer promotes a [100] preferred orientation in the underlayer which in turn promotes a [11$\bar{2}$0] preferred orientation in the magnetic layer. The RuAl layer establishes the preferred orientation which is followed by the NiAl.

DETAILED DESCRIPTION OF THE PREFERRED EMBODIMENTS

Figure 1:
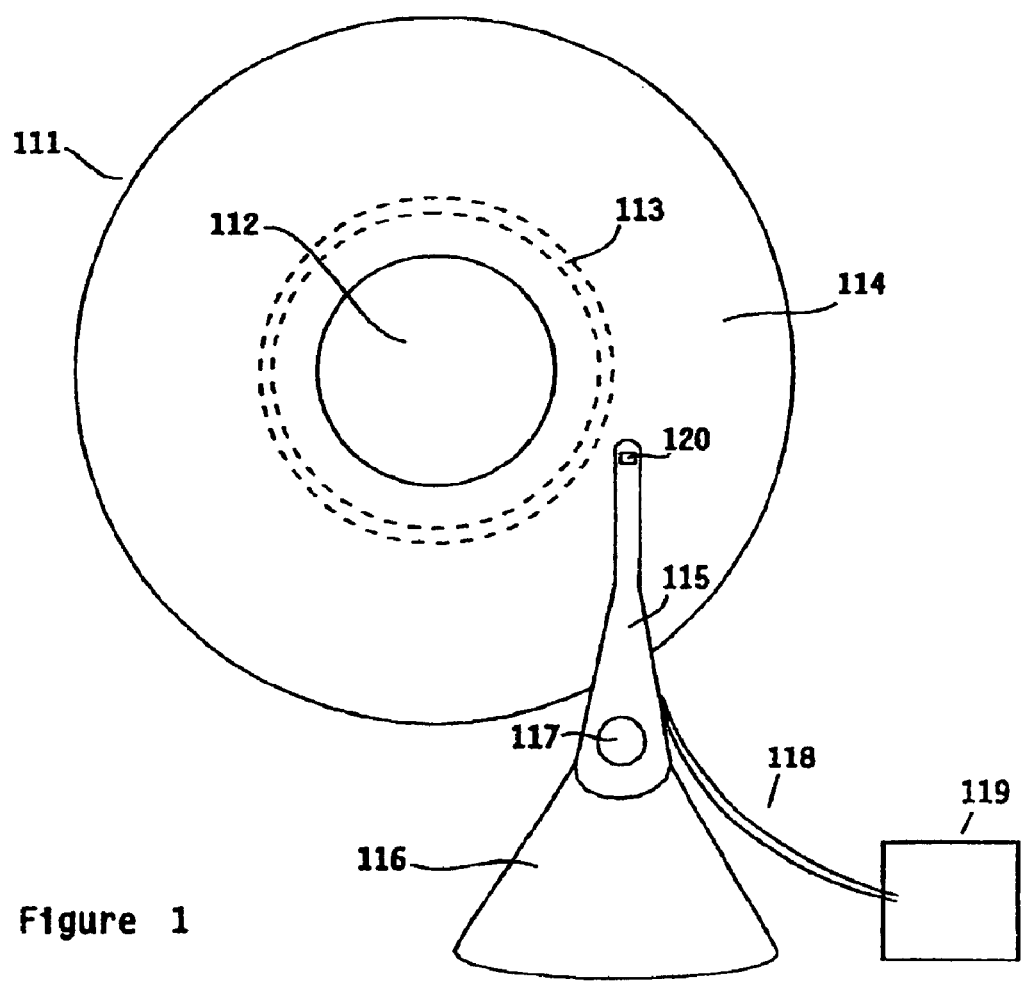
FIG. 1 illustrates a top view of a prior art disk drive with a rotary actuator useful in practicing the present invention.

RuAl tends to form the B2 (cesium chloride) structure in a sputtered thin film. Small amounts at other materials could conceivably be added to RUAl without disrupting the critical B2 structure. The B2 structure is an ordered cubic structure that can be described as two interpenetrating simple cubic lattices where, for RuAl, Al atoms occupy one lattice and Ru atoms the other. RuAl has a lattice constant which is close to that of Cr even though Cr has a bcc structure. RuAl tends to form smaller grain size than Cr due to the strong bonding between the Ru and Al atoms which reduces atomic mobility during deposition.

The role of the RuAl layer of the invention is to ultimately control the orientation, grain size and grain size distribution of the magnetic grains. The grain size and orientation achieved in a RuAl layer is propagated into the magnetic layer through epitaxial growth of properly selected subsequent layers including the magnetic layer. Whereas the traditional thin film magnetic disk has only three layers e.g., underlayer, magnetic layer and overcoat, the trend in the field is toward using additional layers. The terminology for these additional layers has not become standardized, but in a descriptive sense, there may pre-seed layers, seed layers, one or more underlayers, nonmagnetic or magnetic onset layers, a plurality of magnetic layers which may or may not have spacers layers separating them. In addition what is called the substrate may in fact be multilayered material. In this context of proliferating layers, the RuAl layer can be effective in achieving the beneficial results described heroin so long as it is deposited in the B2 structure and ahead of the magnetic layer. Thus, the RuAl layer can be:

1) deposited as the first layer on a substrate which may already have a multilayered structure preferably with a final amorphous layer;
2) as the layer preceding an underlayer or
3) as the first layer to influence crystallographic orientation and grain size.

The grain size of a poly-crystalline thin film is determined by the ratio of the lateral grain growth rate to the nucleation rate. Since smaller grain size improves SNR it is desirable to reduce the lateral growth rate by choosing seed layer materials with ow surface mobility. This low surface mobility is achieved with the strongly bonded B2 structure intermetallics as discussed in U.S. Pat. No. 5,693,426 by Lambeth, et al. However, the 426 patent does not disclose RuAl which the present inventors have discovered is a particularly desirable intermetallic of B2 structure in part because of its high melting point (2030 C compared to 1638 C for NlAl). The high melting point is an indicator of high atomic bond strength and low surface mobility at the film deposition temperature (200–250 C). The lattice parameter for RuAl is 3.03 A which is somewhat larger than NiAl at 2.89 A and Cr at 2.88 A.

In a preferred embodiment of the invention, an RuAl seed layer is deposited onto a glass substrate by standard sputtering techniques. Preferably the glass is smooth and is not circumferentially polished (Use of the RuAl structure on circumferentially polished substrates will be discussed below). It is followed by a Cr-alloy underlayer, a Co-alloy onset layer and a CoPtCrB magnetic layer. The use of an onset layer is described in a commonly assigned, co-pending U.S. patent application with Ser. No. 08/976,565, which is hereby incorporated by reference. Briefly, the onset layer material is selected in part for its lattice match with the underlayer. Lattice parameters which are intermediate between that of the underlayer and the magnetic layer may strengthen the epitaxy in the desired orientation. The preferred onset layer is of hexagonal close packed structured material which may be magnetic or nonmagnetic. Materials which are usable for the onset layer include a wide range of cobalt alloys such as CoCr, CoPtCr and CoPtCrTa. A specific example, a magnetic onset layer of CoPtCrTa might comprise 4 to 14 at. % platinum, 10 to 23 at. % chromium and 1 to 5 at. % tantalum with the rest being Co. Other commonly used hcp magnetic materials which could be used for the onset layer include CoNiCr, CoCrTa, etc. Nonmagnetic materials such as CoCr (Cr>30 at. %) can also be used as onset layers.

Although the inventors prefer to use the onset layer, it is not necessary to include it in the structure. Thus, a RuAl/CrX/CoX structure is a practical embodiment of the invention.

The significant difference between the lattice parameter of RuAl and Cr means that pure Cr is not an optimum underlayer for RuAl. To improve the lattice match between the RuAl and the underlayer a material such as vanadium or titanium is added to expand the lattice of chromium atoms to make it closer to the 3.03 A of RuAl. Thus, CrV or CrTi alloys are preferred for the underlayer. Titanium expands the lattice more than vanadium, so a CrV20 has a lattice parameter of 2.90 Angstroms while CrTi10 is at 2.91 Angstroms. The useful range of vanadium in CrV is expected to be between 10 and 50 at. %. The useful range of titanium in CrTi is expected to between 5 and 25 at. %.

Table 1 gives bulk magnetic parameters and recording results for disks made with NiAl and RuAl seed layers. Both sets of disks used CrV20 underlayers and CoCr37 onset layers with CoPt12Cr20B8 magnetic alloys. The increased remanent magnetization (Mr) with RuAl is due to the increased squareness (Mr/Ms). An improvement in the SNR of 0.7 dB is observed for RuAl compared to NiAl.

TABLE 1

Bulk Magnetic and Recording Results at 280 kbpi

| Seed | Hc Oe | Mrt memu/cm$^2$ | Mr emu/cm$^3$ | S* | Resolution % | SNR dB |
|---|---|---|---|---|---|---|
| RuAl | 4270 | 0.40 | 250 | 0.82 | 50.6 | 29.3 |
| NiAl | 4370 | 0.39 | 237 | 0.77 | 48.4 | 28.6 |

Figure 3:
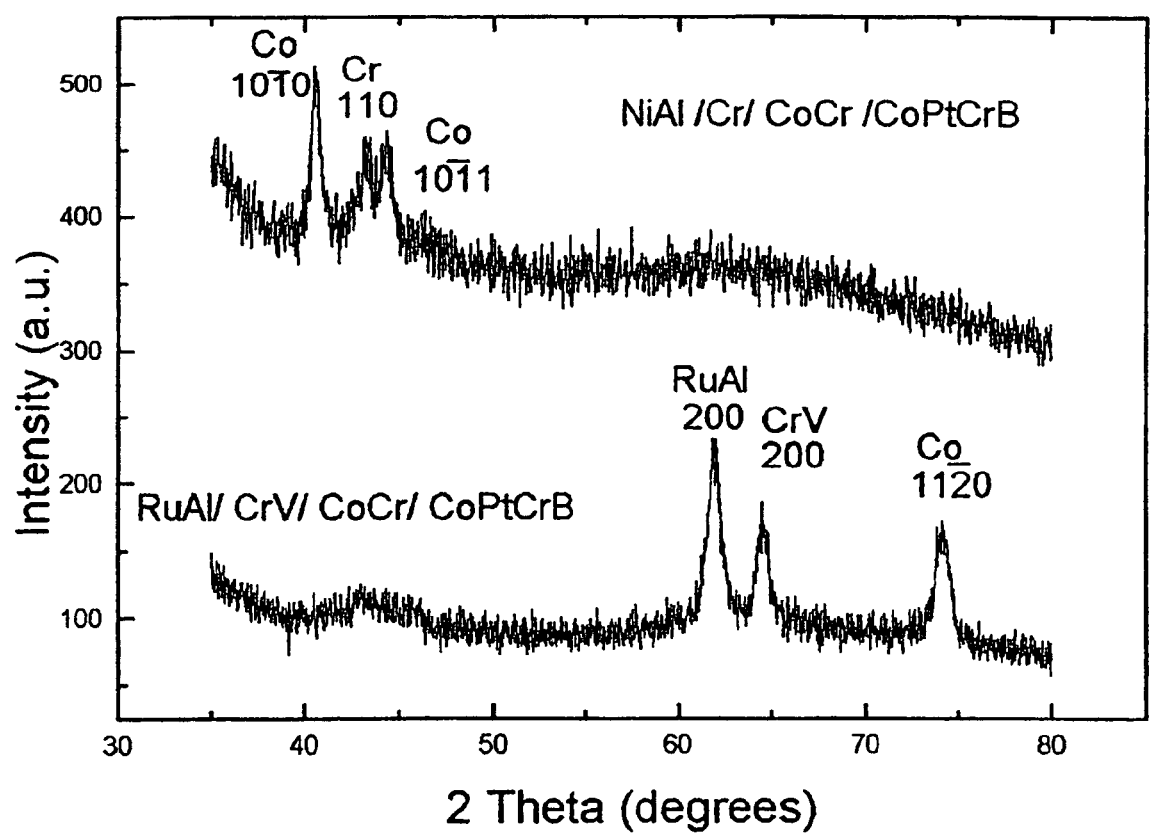
FIG. 3 illustrates x-ray diffraction data for a magnetic disk with an RuAl structure according to the invention.

The resolution was also improved on the RuAl disk. The high squareness achieved with the RuAl seed layer is a result of creating a strong Co-alloy texture with ($11\bar{2}0$) planes parallel to the substrate surface. This is a consequence of [100] texture in the Cr-alloy layer. This orientation is markedly and surprisingly different from that obtained with NiAl even though RuAl and NiAl each have the B2 structure. FIG. 3 shows x-ray diffraction results for an RuAl/CrV/CoCr/CoPtCrB structure. As shown in the prior art the NiAl seeded structure results in [211] texture in the Cr underlayer. The [211] texture promotes the [$10\bar{1}0$] texture in the Co-alloy (and to a lesser degree [$10\bar{1}1$]). The x-ray diffraction result for the RuAl seed layer structure shows that RuAl and CrV 200 peaks are observed indicating the RuAl and CrV grow with [100] texture. The RuAl and CrV 200 peaks are seen to be offset from one another due to the larger lattice parameter of RuAl compared to CrV. The only significant Co-alloy peak observed is the ($11\bar{2}0$). Additional X-ray diffraction analysis (not shown) indicates that the Co-alloy c-axis is more highly aligned in the plane of the film for the RuAl seed compared to the NiAl seed.

For the NiAl seed layer structure, Co-alloy both $10\bar{1}0$ and $10\bar{1}1$ peaks are observed.

The orientation with ($11\bar{2}0$) planes parallel to the surface has been used in longitudinal recording for many years on circumferentially polished (i.e. scratched) NiP substrates which have an orientation ratio of coercivity greater than one. The [$10\bar{1}0$] preferred orientation does not result in disks with an orientation ratio greater than one. Therefore, under some circumstances there could be some advantage to creating the RuAl/CrX structure on circumferentially polished substrates in addition to the other improvements described above. Present circumferentially polished disks typically have a peak-to-valley roughness less than 10 nm as measured by atomic force microscopy. Information on the microtopography of such substrates and the polishing equipment to achieve circumferential texture is available in the prior art, see for example, as in Jones, et al. U.S. Pat. No. 5,490,809.

Figure 2:
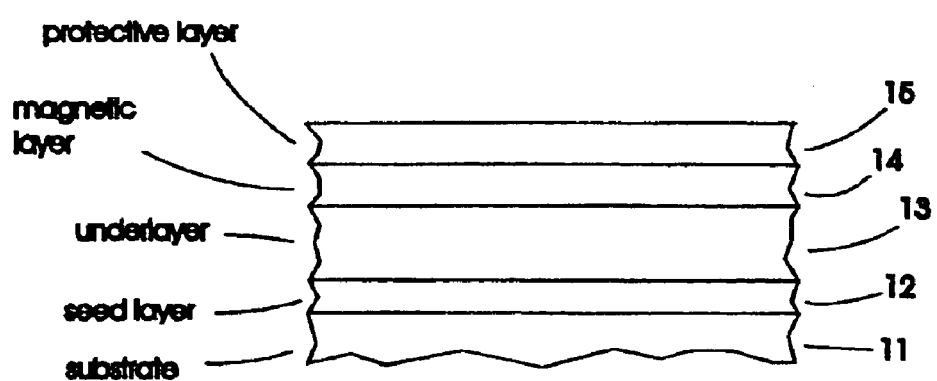
FIG. 2 illustrates the layer structure of a thin film magnetic disk according to the invention.

FIG. 2 illustrates the cross sectional layer structure of an embodiment of a thin film magnetic disk according to the invention. The thin film layers will be deposited onto at least one and preferably both planar surfaces of the disk to form the data recording area. The substrate 11 may be made of glass or any other suitable material. The RuAl seed layer 12 is deposited directly onto the substrate. The seed layer could also be a "double" layer with a layer of RuAl followed by a layer of NiAl, for example. This double layer configuration could result in a cost savings by reducing the required amount of Ru which is the more expensive element of this group. In the double layer structure the RuAl establishes the grain size and orientation and the subsequently deposited NiAl follows the established patterns. The underlayer 13 is deposited onto the seed layer and is a nonferromagnetic material such as a chromium alloy such as CrV or CrTi. The onset layer 14 has been more fully described in the copending application, but is typically a thin layer of an hcp material such as CoCr, CoPtCr and CoPtCrTa. The magnetic layer 15 is an alloy of cobalt which typically contains platinum and chromium and may contain additional elements such as tantalum or boron, e.g. CoPtCrTa or CoPtCrB. Although the use of the RuAl layer does not require special selection of magnetic layer material, a typical magnetic layer might comprise 4 to 16 at. % platinum, 14 to 23 at. % chromium and 2 to 10 at. % boron with the rest being Co. The optional top layer is a protective overcoat 16 which is typically carbon based and may contain hydrogen and/or nitrogen, but any other protective material may be used. It is also known in the art to use additional layers between the magnetic layer and the overcoat to either enhance the adhesion of the overcoat, improve hardness, etc. The various layers are preferably sputter deposited using standard techniques, targets, temperatures and pressures as are known to those skilled in the art.

The relative thicknesses of the layers are not believed to be critical for practicing the invention, but the following ranges are given as guidance. The seed layer is preferably from 2 to 50 nm thick. The underlayer is typically thicker than the seed layer, but wide variations in the thickness of the underlayer (e.g. 10 to 80 nm) result in only small changes in the magnetic characteristics of the disk. A typical value for the thickness of the underlayer is 30 nm. The onset layer can be 1.5 to 7.0 nm. The magnetic layer can be from 5–50 nm thick with 20 nm being typical. The use, composition and thickness of the overcoat are not critical in practicing the invention, but a typical thin film disk might use an overcoat less than 15 nm thick.

While the compositions listed above have been given without regard to contamination percentages, it is known to those skilled in the art that some contamination is normally if not always present in thin films. Sputtering targets are typically specified as 99.9% or greater purity, but the resulting films may have much lower purity due to contamination in the sputtering chamber or other factors. For example, contamination by air in the chambers might result in measurable amounts of oxygen and/or hydrogen being incorporated into the film. It is also known that some small amount of oxygen is normally found in Cr targets and in the resulting Cr layer. It is also possible for small amounts of the working gas in the sputtering system, e.g. argon, to be incorporated into a sputtered film. Contamination levels were not specifically measured in the disk samples described and, therefore, were assumed to be within normal ranges for sputtered thin film disks expected by those skilled in the art. The thin film disk made according to the invention can be used for storing data in typical disk drives using either magnetoresistive or inductive heads and can be used in contact recording or with flyable heads. The read/write head is positioned over the rotating disk in the standard manner to either record or read magnetic information.

FIG. 1 is a top view illustrating a prior art disk drive with a rotary actuator useful in practicing the present invention. The system comprises one or more magnetic recording disks 111 mounted on spindle 112 which is rotated by an in-hub electrical motor (not shown). An actuator assembly 115 supports a slider 120 which contains one or more read/write heads. The assembly may be composed of a plurality of actuators and sliders arranged in a vertical stack with the actuators supporting the sliders in contact with the surfaces of the disks when the disks are not rotating or being unloaded to avoid contact. A voice coil motor (VCM) 116 moves the actuator assembly 115 relative to the disks by causing the assembly to pivot around shaft 117. The heads are typically contained in air bearing sliders adapted for flying above the surface of the disks when rotating at sufficient speed. In operation, when the sliders are flying above the disks the VCM moves the sliders in an arcuate path across the disks allowing the heads to be positioned to read and write magnetic information from circular tracks formed in the data area 114 which is coated with the thin films described above. Electrical signals to and from the heads and the VCM are carried by a flex cable 118 to the drive electronics 119. When not operating and during periods when the rotation of the disks is either starting or stopping, the sliders may be positioned in physical contact with the surface of the disks in a landing zone or contact start/stop (CSS) area 113 which is not used for data storage even though the magnetic coating extends over this area. It is also known to remove the sliders from the disks during nonoperating periods using an unload ramp. Although the disk drive has been described with air bearing sliders the disk of the present invention may easily be used in other storage devices having near contact, or contact recording sliders.

While the preferred embodiments of the present invention have been illustrated in detail, it will be apparent to the one skilled in the art that alternative embodiments of the invention are realizable without deviating from the scope and spirit of the invention.

What is claimed is:

1. A thin film magnetic disk comprising:
    a ruthenium-aluminum (RuAl) seed layer with a B2 crystallographic structure; and
    a nickel-aluminum (NiAl) layer with a B2 crystallographic structure deposited onto the RuAl seed layer.

2. The thin film magnetic disk of claim 1 further comprising a nonmagnetic underlayer deposited subsequent to the NiAl layer, the nonmagnetic underlayer having a [100] crystallographic structure.

3. The thin film magnetic disk of claim 2 further comprising an onset layer deposited onto the underlayer prior to a magnetic layer.

4. The disk of claim 2 wherein the underlayer is an alloy of chromium.

5. The disk of claim 2 wherein the underlayer contains greater than 5 at. % of vanadium or titanium.

6. The disk of claim 2 wherein the underlayer contains approximately 20 at. % of vanadium.

7. The disk of claim 2 wherein the underlayer contains approximately 10 at. % of titanium.

8. The disk of claim 3 wherein the onset layer comprises a magnetic alloy of cobalt.

9. The disk of claim 3 wherein the onset layer comprises a nonmagnetic alloy of CoCr.

10. The disk of claim 1 wherein the RuAl seed layer is between 2 and 50 nm in thickness.

11. The disk of claim 1 further comprising a magnetic layer of CoPtCrTa, CoPtCrB or CoPtCr.

12. The disk of claim 11 wherein the magnetic layer has a [11$\bar{2}$0] preferred orientation.

13. The disk of claim 1 further comprising a circumferentially polished substrate.

14. A disk drive comprising:
    a motor for rotating a spindle;
    a thin film magnetic disk mounted on the spindle comprising a ruthenium-aluminum (RuAl) seed layer with a B2 crystallographic structure followed by a nickel-aluminum (NiAl) layer, a nonmagnetic underlayer deposited subsequent to the NiAl layer with a [100] preferred orientation and a magnetic layer; and an actuator assembly including a head for writing magnetic information on the disk as it rotates.

15. The disk drive of claim 14 wherein the magnetic layer has a [11$\bar{2}$0] preferred orientation.

16. The disk drive of claim 15 wherein the thin film magnetic disk further comprises a circumferentially polished substrate.

17. The disk drive of claim 15 wherein the RuAl seed layer is from 2 nm to 50 nm thick.

18. The disk drive of claim 15 wherein the underlayer is a chromium alloy with greater than 5 at. % vanadium or titanium.

19. A method of manufacturing a thin film disk comprising the steps of:

depositing a ruthenium-aluminum (RuAl) layer with a B2 crystallographic structure;

depositing a nickel-aluminum (NiAl) layer with a B2 crystallographic structure onto the RuAl;

depositing a underlayer with a [100] preferred orientation subsequent to the NiAl layer; and depositing a magnetic layer with a a [11$\bar{2}$0] preferred orientation subsequent to the underlayer.

20. The method of claim 19 wherein a substrate on which the RuAl layer is deposited is circumferentially polished.

* * * * *